Jan. 14, 1930.  H. F. CONGABLE  1,743,431
IRRIGATION PIPE
Filed July 6, 1925

INVENTOR.
HENRY F. CONGABLE
BY
ATTORNEYS.

Patented Jan. 14, 1930

1,743,431

UNITED STATES PATENT OFFICE

HENRY F. CONGABLE, OF OAKLAND, CALIFORNIA

IRRIGATION PIPE

Application filed July 6, 1925. Serial No. 41,688.

The present invention relates to improvements in irrigation pipes and has particular reference to improved means for joining a plurality of lengths so as to establish substantially water-tight joints between the same. The present application covers a part of the device described in my co-pending application, Serial Number 19,330.

It is proposed in the present application to disclose a pipe length so constructed that a plurality may be easily telescoped one on the other whereby the length of the pipe as a whole may be extended indefinitely. It is further proposed to form each length of two sections, one being of considerable length and being made of comparatively light material and the other being short and tapered and made of heavy material, the tapered end serving as a joint between two long sections.
For this purpose it is permanently secured to one of the long sections by means of an enlarged cylindrical portion set off from the large end of the taper and fitting over one end of the long section, while the second long section is telescoped over the small end of the taper and is properly reinforced at the end engaging with the taper to resist expansion. A certain amount of expansion, however, may be taken care of by effecting a deeper engagement between the taper and the second section.

It is further proposed to provide a tapered section made without seam and shaped from a disc shaped blank by die pressing.
It is further proposed to provide the tapered section with a cylindrical set-off at the large end thereof, the set-off providing an abutment for the extreme end of a long section telescoped into the cylindrical end of the tapered section.

Further objects and advantages of my invention will appear as the specification proceeds.

Figure 1:
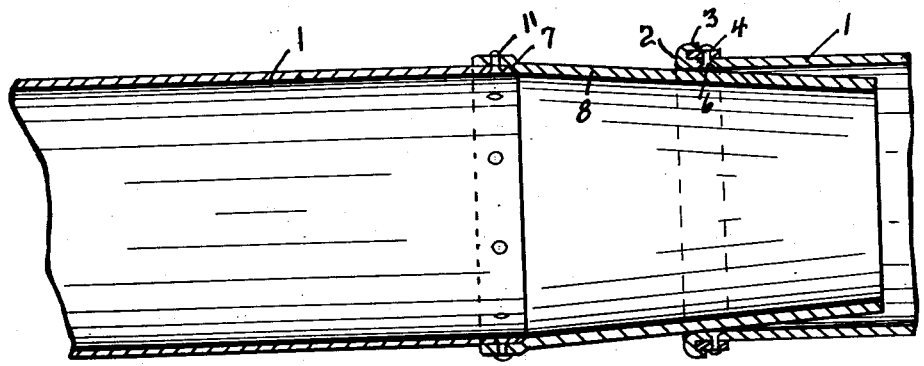
Figure 2:
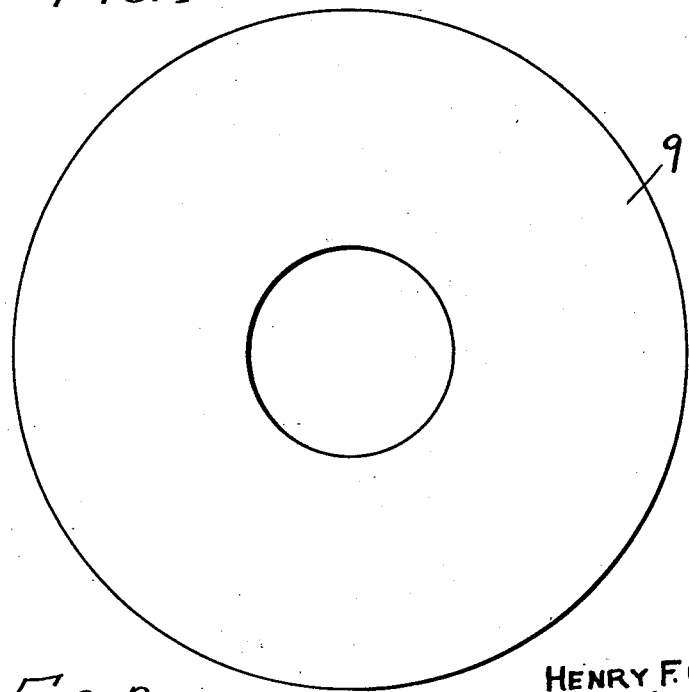

The preferred form of my invention is illustrated in the accompanying drawing, in which Figure 1 shows a longitudinal section through a joint between two long sections of pipe and Figure 2 a blank from which a seamless taper is formed for joining the two lengths.

While I have shown only the preferred form of the invention, it should be understood that various changes or modifications may be made within the scope of the claims hereto attached without departing from the spirit of the invention.

Referring to the drawings in detail, the long sections 1 of my irrigation pipe are made cylindrical in form and terminate at one end in a flange 2 turned back on the pipe to provide a rim 3 which latter is spaced from the body of the pipe to accommodate a ring 4 interposed between the rim and the body. The ring is of somewhat heavier material than the pipe and is preferably riveted thereto as shown at 6. The ring and the overturned rim co-operate in reinforcing the end of the pipe and in resisting expansion of the latter to some extent when the same is driven on the small end of the taper as shown in the drawing.

The other end of the long section is uniform with the body of the same and preferably presents a tapered end face as shown at 7.

The tapered section 8 is designed for permanent junction with one of the long sections and for detachable connection with a second long section. It is preferably made seamless and formed from a disc-shaped blank shown at 9. This blank is die-pressed to form a cup and then by continuous pressing is further drawn to form a taper as illustrated in Figure 1. The large end of the taper is set off into a cylindrical portion by pressing or spinning the metal outwardly and forms an annular flange adapted to serve as an abutment for the end of a long section telescoped into the taper section as well as for the other end of a second long section driven on the outside of the conical section when the second section has expanded sufficiently to reach the base of the cone.

Rivets 11 may be used for permanently fastening the cylindrical portion of the cone to the end of the long section.

In making the tapered section from a blank in the manner described, the relatively soft metal of the blank becomes hardened in the drawing operation, giving a stiff, rigid taper end.

Having described my invention, I claim:—

1. In a pipe connection, a pipe section having a band mounted adjacent the end thereof, the edge of said pipe section being turned back and bearing on said band, a frustro-conical connecting member driven into the pipe section to form a frictional joint, the large end of said conical connecting member being secured to a second pipe section.

2. In a pipe connection, a pipe section having a reinforcing band mounted securely adjacent the end thereof, the edge of said pipe connection being turned back and bearing on said band, a frusto-conical connecting member having a large end with outer diameter greater than the inner diameter of the pipe section and a small end with outer diameter less than the inner diameter of the pipe section, said conical connecting member driven into the pipe section to form a friction joint, the large large end of said conical connecting member being connected with a second pipe section.

In testimony whereof I affix my signature.

HENRY F. CONGABLE.